United States Patent
Roslund et al.

(10) Patent No.: US 12,276,549 B2
(45) Date of Patent: Apr. 15, 2025

(54) NOISE MITIGATION IN VAPOR CELL SPECTROSCOPY

(71) Applicant: Vector Atomic, Inc., Pleasanton, CA (US)

(72) Inventors: Jonathan David Roslund, Pleasanton, CA (US); Martin Machai Boyd, Pleasanton, CA (US); Arman Cingoz, Pleasanton, CA (US); William David Lunden, Dublin, CA (US)

(73) Assignee: VECTOR ATOMIC, INC., Pleasanton, CA (US)

( * ) Notice: Subject to any disclaimer, the term of this patent is extended or adjusted under 35 U.S.C. 154(b) by 276 days.

(21) Appl. No.: 17/933,735

(22) Filed: Sep. 20, 2022

(65) Prior Publication Data

US 2024/0094055 A1 Mar. 21, 2024

(51) Int. Cl.
*G01J 3/433* (2006.01)
*G01J 3/02* (2006.01)

(52) U.S. Cl.
CPC ........... *G01J 3/4338* (2013.01); *G01J 3/0205* (2013.01)

(58) Field of Classification Search
CPC ....... G01J 3/4338; G01J 3/0205; H01S 3/005; H01S 3/0085; H01S 3/1305; H01S 3/1304; H01S 3/1303; G04F 5/14
See application file for complete search history.

(56) References Cited

U.S. PATENT DOCUMENTS

| | | | |
|---|---|---|---|
| 6,172,570 B1 | 1/2001 | Deng | |
| 2009/0316740 A1* | 12/2009 | Zhu | H01S 5/0687 372/34 |
| 2019/0181611 A1* | 6/2019 | Maleki | H01S 3/094076 |
| 2020/0259498 A1 | 8/2020 | Gerginov | |
| 2023/0344189 A1 | 10/2023 | Olson et al. | |

OTHER PUBLICATIONS

Wu (2018. Modulation transfer spectroscopy for D1 transition line of rubidium. JOSA B, 35(11), pp. 2705-2710 (Year: 2018).*
Araya et al., Iodine-stabilized Nd:YAG laser applied to a long-baseline interferometer for wideband earth strain observations, Review of Scientific Instruments 73, 2434 (2002); doi: 10.1063/1.1477606.

(Continued)

*Primary Examiner* — Abdullahi Nur
*Assistant Examiner* — Mohamed Doumbia
(74) *Attorney, Agent, or Firm* — Patterson + Sheridan, LLP

(57) ABSTRACT

Embodiments herein describe spectroscopy systems that use an unmodulated reference optical signal to mitigate noise, or for other advantages. In one embodiment, the unmodulated reference optical signal is transmitted through the same vapor cell as a modulated pump optical signal. As such, the unmodulated reference optical signal experiences absorption by the vapor, which converts laser phase noise to amplitude noise like the other optical signals passing through the vapor cell. In one embodiment, the unmodulated reference optical signal has an optical path in the gas cell that is offset (or non-crossing) from the optical path of the modulated pump optical signal. The unmodulated reference optical signal allows removal or mitigation of the noise on the other optical signal.

20 Claims, 10 Drawing Sheets

(56) References Cited

OTHER PUBLICATIONS

Hori et al., Formulation of frequency stability limited by laser intrinsic noise in feedback systems, Applied Optics, vol. 48, No. 2, Jan. 10, 2009.
European Patent Office, Extended European Search Report for European Patent Application No. 23197340.5, dated Feb. 23, 2024.
Camparo, J. C. (1998). Conversion of laser phase noise to amplitude noise in an optically thick vapor. JOSA B, 15(3), 1177-1186.
Mileti, G., Deng, J. Q., Walls, F. L., Lowe, J. P., & Drullinger, R. E. (Jun. 1996). Recent progress in laser-pumped rubidium gas-cell frequency standards. In Proceedings of 1996 IEEE International Frequency Control Symposium (pp. 1066-1072). IEEE. [Abstract Only].
Gerginov, V., Knappe, S., Shah, V., Hollberg, L., & Kitching, J. (2008). Laser noise cancellation in single-cell CPT clocks. IEEE Transactions on Instrumentation and Measurement, 57(7), 1357-1361.

* cited by examiner

NOISE MITIGATION IN VAPOR CELL SPECTROSCOPY

STATEMENT OF GOVERNMENT INTEREST

This invention was made with government support under Contract No: W56KGU21C0017 awarded by the Army Research Laboratory. The government has certain rights in the invention.

BACKGROUND

Field

Embodiments of the present invention generally relate to transmitting an unmodulated reference optical signal through a vapor cell to mitigate noise when performing spectroscopy.

Description of the Related Art

The short-term instability of atomic clocks is limited by the achievable signal-to-noise ratio (SNR) of the measured atomic resonance feature of interest. The fundamental limit to the SNR is quantum-mechanical in origin and is given by the shot-noise limit. In practice, however, laser noise often dominates the shot-noise limit and reduces the achievable SNR. For instance, amplitude noise fluctuations of the laser above the shot-noise limit are directly imprinted upon the error signal noise floor. In the case of vapor cells (also referred to as gas cells), the wavelength-dependent absorption experienced by the probe beam serves as a discriminant for converting laser phase noise (PM) into amplitude noise (AM). This PM to AM noise conversion depends upon the experimental conditions (e.g., vapor temperature) and directly adds to the detected signal, thereby obscuring the resonance feature of interest. This noise conversion process has been recognized as a limiting factor for a variety of vapor cell based atomic clocks, including but not limited to, coherent population trapping (CPT) atomic clocks, pulsed optically pumped (POP) clocks, and Modulation Transfer Spectroscopy (MTS)-based platforms, such as molecular iodine, acetylene, or rubidium.

The impact of this PM to AM noise conversion may be passively mitigated with expensive, low phase-noise laser sources if available at the desired wavelengths. However, this drives up the cost significantly.

SUMMARY

One embodiment herein is a spectroscopy system that includes a vapor cell configured to receive as inputs an unmodulated reference optical signal and a modulated pump optical signal where the unmodulated reference optical signal and the modulated pump optical signal have separate and non-crossing optical paths in the vapor cell. The spectroscopy system also includes a control system configured to detect optical signals resulting from the unmodulated reference optical signal and the modulated pump optical signal passing through the vapor cell and generate a laser adjustment signal for adjusting a wavelength or frequency of a first optical source where an output of the first optical source is used to generate the modulated pump optical signal.

Another embodiment herein is a method that includes transmitting an unmodulated reference optical signal and a modulated pump optical signal through a vapor cell in parallel where the unmodulated reference optical signal and the modulated pump optical signal have separate and non-crossing optical paths in the vapor cell and generating a laser adjustment signal for adjusting a wavelength of a first optical source based on the unmodulated reference optical signal and the modulated pump optical signal passing through the vapor cell where the first optical source generates the modulated pump optical signal.

Another embodiment herein is a spectroscopy system that includes a first vapor cell configured to receive as an input an unmodulated reference optical signal, a second vapor cell configured to receive as an input a modulated pump optical signal, and a control system configured to detect optical signals resulting from the unmodulated reference optical signal and the modulated pump optical signal passing through the first and second vapor cells and generate a laser adjustment signal for adjusting a wavelength or frequency of a first optical source where an output of the first optical source is used to generate the modulated pump optical signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments herein describe spectroscopy systems that use an unmodulated reference optical signal to mitigate noise. In one embodiment, the unmodulated reference optical signal is transmitted through the same vapor cell as a modulated pump optical signal. As such, the unmodulated reference optical signal experiences absorption by the vapor, which converts laser phase noise to amplitude noise like the other optical signals passing through the vapor cell. In one embodiment, the unmodulated reference optical signal has an optical path in the gas cell that is spatially offset (or non-crossing) from the optical path of the modulated pump optical signal (and any other optical signal passing through the vapor cell). Put differently, the unmodulated reference optical signal does not interact with the other optical signal(s) passing through the same vapor cell. Hence, the converted noise that is present on the unmodulated reference optical signal upon exiting the vapor cell is highly correlated with the noise on the other optical signal(s) passing through the cell. Post-processing can then use the unmodulated reference optical signal to remove or mitigate the negative impacts of PM to AM noise conversion, as well as other potential advantages described in more detail below.

Further, the embodiments herein can be applied with any spectroscopy system that experiences laser noise (whether from PM to AM noise conversion or from some other source) that can be abated by using an unmodulated reference signal. Two non-limiting examples of spectroscopy techniques that can benefit from using an unmodulated reference signal are MTS and Frequency Modulation Spectroscopy (FMS). The embodiments herein can provide improved results while using only one vapor cell (e.g., without the use of secondary vapor cells) and without having to rely on costly low phase-noise laser sources. However, in other embodiments, a secondary vapor cell can still be used.

Figure 1:
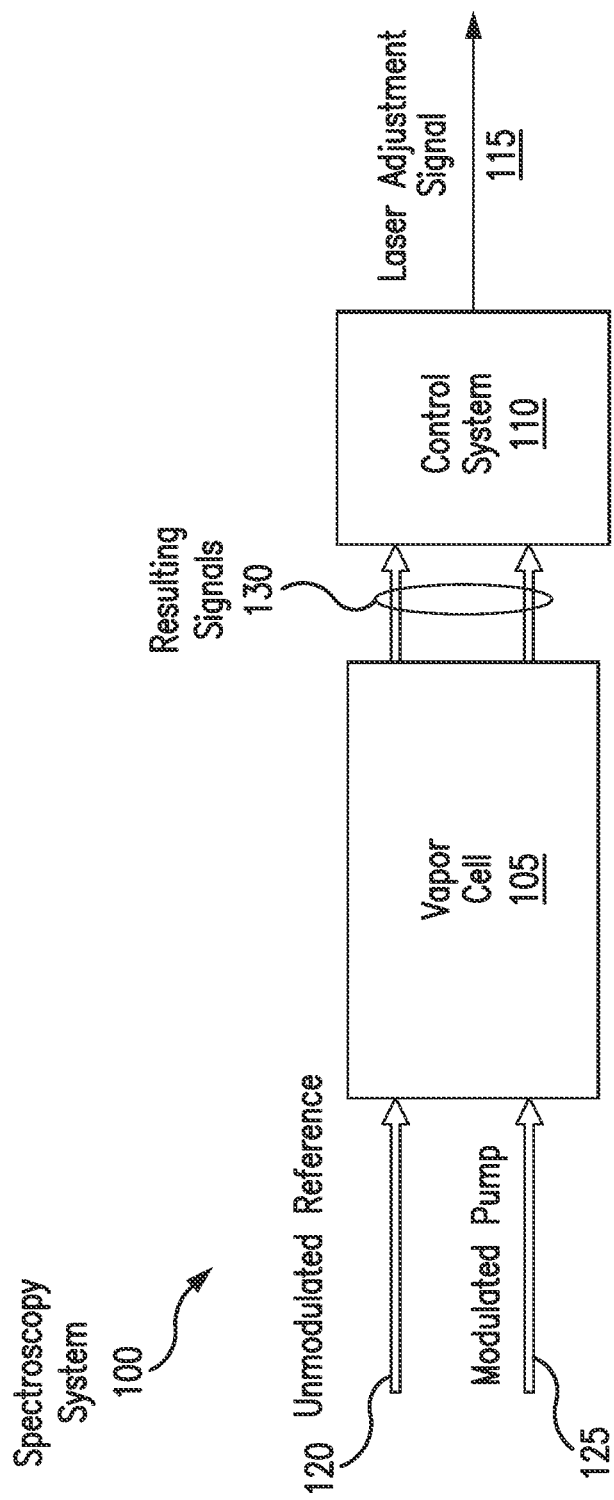
FIG. 1 is a block diagram of a spectroscopy system, according to one embodiment.

FIG. 1 is a block diagram of a spectroscopy system 100, according to one embodiment. The system 100 includes a vapor cell 105 and a control system 110. The vapor cell 105 is a container (e.g., a tube) that contains atoms or molecules that have a well-defined absorption spectrum. At least a portion of the sides or walls of the vapor cell 105 is transparent so that optical signals can enter and leave the cell 105. Light absorption can be measured while changing the wavelength of an optical signal being transmitted through the vapor cell 105 which results in a peak or a series of peaks. However, the definition of the peak can vary based on the type of spectroscopy being implemented. At a peak, the optical signal is absorbed by the vapor in the cell 105 while at other wavelengths, the optical signal passes through the vapor cell 105 with minimal absorption.

In this embodiment, the vapor cell 105 has two inputs that receive an unmodulated reference optical signal 120 and a modulated pump optical signal 125, respectively. The optical signals 120 and 125 can pass through the vapor cell 105 in parallel but along different optical paths. In one embodiment, the paths of the optical signals 120 and 125 are spaced apart or offset such that the optical signals 120 and 125 do not interact in the vapor cell 105 (e.g., the modulation on the modulated pump optical signal 125 is not imparted to the unmodulated reference optical signal 120). In one embodiment, to prevent any interaction, the optical paths of the optical signals 120 and 125 do not cross in the vapor cell 105 (i.e., non-crossing paths). In one embodiment, the optical paths of the optical signals 120 and 125 in the vapor cell 105 are separated by a distance that is at least double the diameter of the modulated pump optical signal 125. In this manner, the modulation on the modulated pump optical signal 125 is not imparted to the unmodulated reference optical signal 120.

As described in more detail below, the modulated pump 125 may be modulated (e.g., dithered) where its frequency/wavelength is changed in order to identify a peak in the absorption spectrum of the vapor cell 105. Identifying a peak can be used to ensure a carrier wavelength of the modulated pump optical signal 125 is at a precise wavelength. That is, by identifying when the wavelength of the modulated pump optical signal 125 is at a peak of the absorption spectrum, the control system 110 can lock the optical source (not shown) that generates the modulated pump 125 to the wavelength corresponding to the peak. This optical source can then be used in precise timing applications such as atomic clocks as well as other applications.

The unmodulated reference optical signal 120 can be used by the control system 110 (e.g., hardware (e.g., electronics, integrated circuit, field programmable gate array, etc.), software, or combinations thereof) to mitigate or remove the negative impacts of PM to AM noise conversion.

The control system 110 detects optical signals 130 resulting from the unmodulated reference optical signal 120 and the modulated pump optical signal 125 passing through the vapor cell 105. In one embodiment, the control system 110 uses a photodiode to directly detect the unmodulated reference optical signal 120 after passing through the vapor cell 105 one or more times. That is, the modulated pump optical signal 125 is one of the resulting signals 130 detected by the control system 110. Alternatively, the control system 110 can use fluorescence detection from separate imaging of regions of the cell containing the unmodulated and modulated laser beams. In this example, the unmodulated reference optical signal 120 may not be directly detected, but rather the resultant signals 130 being detected can include the fluorescence of the vapor cell 105. In either case, as will be discussed in more detail below, the control system 110 can then process the electrical signals derived from the optical signal 120 to remove the PM to AM noise, which reduces the noise floor and improves the SNR.

Moreover, the resulting signals 130 can include other optical signals after they pass through the vapor cell 105. For example, in MTS, a probe optical signal is detected, which is described in FIGS. 2-5. In FMS, the modulated pump 125 is detected by the control system 110 after passing through the vapor cell 105, which is discussed in FIGS. 6 and 7. These resulting signals 130 can be detected either directly or by using fluorescence detection.

In addition to removing the PM to AM noise, the spectroscopy system 100 has other potential advantages such as using the unmodulated reference optical signal 120 to suppress laser relative intensity noise (RIN) which is common to both optical signals 120 and 125 prior to their passage through the vapor cell 105. Moreover, the control system 110 can use the unmodulated reference optical signal 120 to suppress parasitic (inadvertent) modulation where the modulation on the modulated pump optical signal 125 may inadvertently transfer to a probe optical signal (mechanism of transfer not shown in FIG. 1) before the optical signals pass through the vapor cell 105 which may occur in the optical system shown in FIG. 2. Because this parasitic modulation may also be found on the reference optical signal 120, the control system 110 can use the reference optical signal 120 to remove the parasitic modulation from the probe optical signal.

The control system 110 detects the resulting signals 130 and outputs a laser adjustment signal 115 for adjusting the optical source that generates the modulated pump optical signal 125, which in some embodiments is the same optical source that generates the unmodulated reference. For example, the control system 110 can sweep the carrier frequency or wavelength of the modulated pump optical signal 125 until it matches a peak in the absorption spectrum of the vapor in the cell 105. The control system 110 can continue to monitor resulting signals 130 to keep the carrier frequency or wavelength of the modulated pump optical signal 125 locked to the frequency corresponding to the peak in the absorption spectrum using the laser adjustment signal 115. Thus, as environmental conditions change (e.g., change in temperature, humidity, etc.) or as the optical source ages, the spectroscopy system 100 can keep the optical source outputting a signal at the desired wavelength or frequency which matches a peak in the absorption spectrum of the vapor cell 105.

The spectroscopy system 100 in FIG. 1 can be used in MTS and FMS. Examples of using the system 100 in MTS are described in FIGS. 2-5 while examples of using the system 100 in FMS are described in FIGS. 6 and 7. However, the spectroscopy system 100 is not limited to MTS and FMS and may be useful in other spectroscopy implementations.

Figure 2:
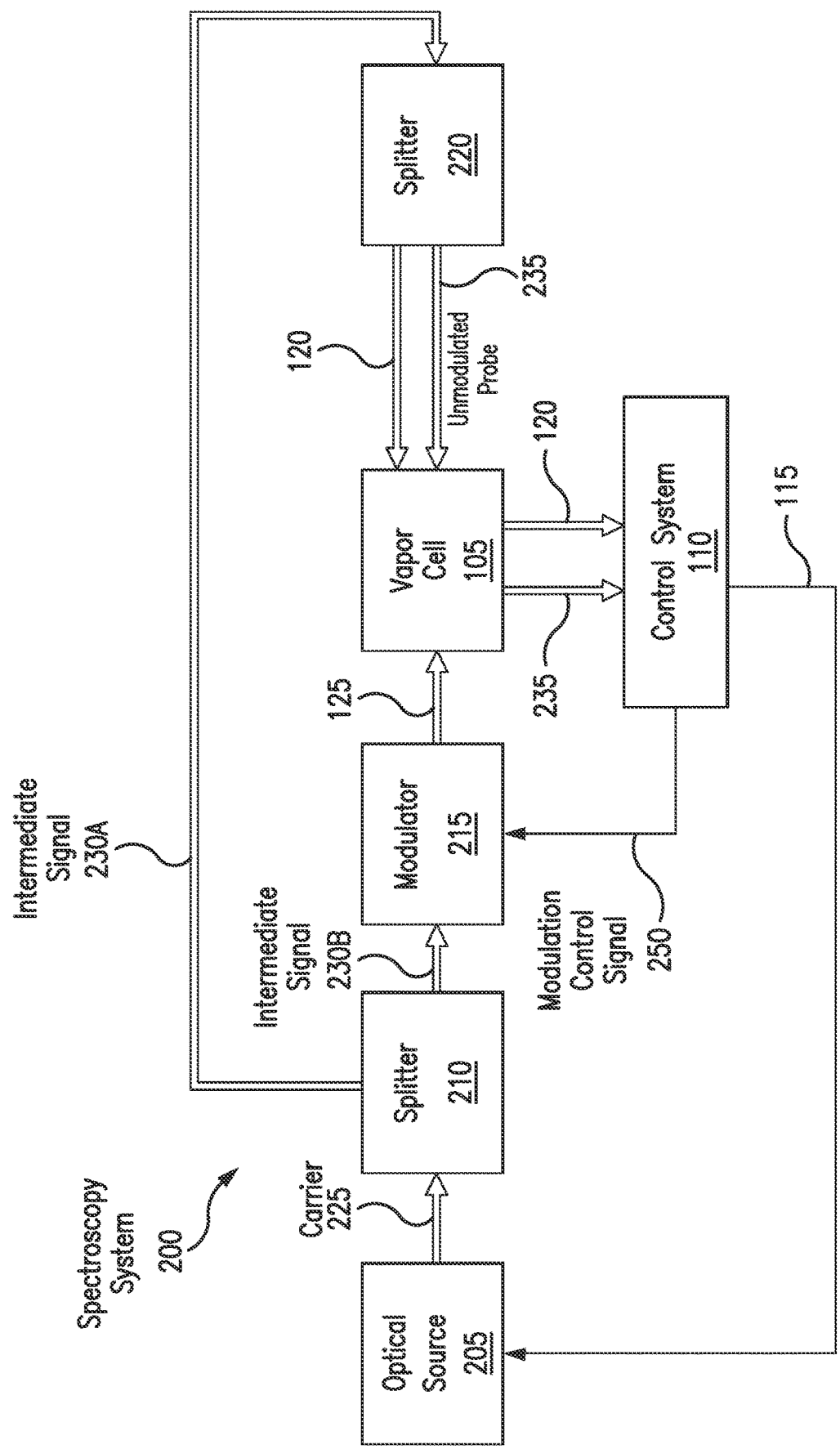
FIG. 2 is a block diagram of a spectroscopy system for performing MTS, according to one embodiment.

FIG. 2 is a block diagram of a spectroscopy system 200 for performing MTS, according to one embodiment. The spectroscopy system 200 can perform MTS using a single optical source 205. As shown, the optical source 205 (e.g., a laser) outputs a carrier optical signal 225 (e.g., a continuous wave (CW) laser). A splitter 210 receives the carrier optical signal 225 and splits it into two intermediate optical signals 230A and 230B. The splitter 210 can use any desired splitting ratio (e.g., 50/50, 60/40, etc.) to split the power in the carrier optical signal 225 to generate the two intermediate optical signals 230A and 230B. The modulator 215 uses a modulation signal (e.g., from the control system 110) to modulate the intermediate optical signal 230B and generate the modulated pump optical signal 125 introduced in FIG. 1.

The other intermediate optical signal 230A is split by a splitter 220 to output the unmodulated reference optical signal 120 discussed in FIG. 1 and an unmodulated probe optical signal 235. The splitter 220 can split the power in the intermediate optical signal 230A to form the optical signals 120 and 235 using any desired ratio. Notably, in this example, only the pump signal 125 is modulated while the other optical signals (i.e., signals 230A, 230B, 120, and 235) are unmodulated.

To perform MTS, the control system 110 detects when the modulation on the modulated pump optical signal 125 is transferred to the unmodulated probe optical signal 235 when passing through the vapor cell 105. To do so, at least a portion of the optical paths of the pump optical signal 125 and the probe optical signal 235 in the vapor cell 105 are spatially overlapped (e.g., on the same axis). In this example, the pump optical signal 125 and the probe optical signal 235 are input into the vapor cell 105 at opposite ends of the vapor cell 105 but along the same axis so their optical paths are aligned. When the wavelengths of these optical signals 125 and 235 are not at a peak of the absorption spectrum of the vapor, little to none of the modulation in the pump optical signal 125 is transferred to the probe optical signal 235. However, when the wavelengths of these optical signals 125 and 235 are at a peak of the absorption spectrum, the modulation is transferred from the pump optical signal 125 to the probe optical signal 235 which is then detected by the control system 110 using the probe optical signal 235 that is output from the vapor cell 105.

In one embodiment, the reference optical signal 120 is not aligned with the pump optical signal 125. Thus, regardless of whether the wavelengths of the signals are or are not at a peak of the absorption spectrum, very little or none of the modulation of the pump optical signal 125 is transferred to the reference optical signal 120 when passing through the vapor cell 105. However, because the reference optical signal 120 still passes through the same vapor cell 105 as the unmodulated probe optical signal 235, the reference optical signal 120 is also affected by the PM to AM noise conversion. Thus, the reference optical signal 120 can be received by the control system 110 and then used to mitigate or remove the negative effects of PM to AM noise conversion from the probe optical signal 235. For example, the control system 110 can subtract signals derived from the reference optical signal 120 from the signals derived from the probe optical signal 235 to remove the PM to AM noise without removing the desired MTS signal (i.e., the modulation that is transferred from the pump optical signal 125 to the probe optical signal 235 in the vapor cell 105).

In addition to removing or mitigating the PM to AM noise, the control system 110 can also use the reference optical signal 120 to suppress laser RIN which is present on the optical signals prior to passing through the vapor cell 105. Moreover, the control system 110 can use the unmodulated reference optical signal 120 to suppress parasitic (inadvertent) modulation where the modulation on the modulated pump optical signal 125 may inadvertently transfer to the probe optical signal 235 before the optical signals pass through the vapor cell 105. For example, when modulating the pump optical signal 125, some modulation may leak through the optics and affect the intermediate signal 230A, as well as the downstream reference optical signal 120 and the probe optical signal 235. Like with the PM to AM noise, this parasitic modulation affects both of these signals in a similar manner, thus the control system 110 can subtract signals derived from the reference optical signal 120 from the signals derived from the probe optical signal 235 to remove the parasitic modulation that was transferred before the signals passed through the vapor cell 105 without affecting the (desired) modulation that was transferred to the probe optical signal 235 in the vapor cell 105.

When performing MTS, the control system 110 monitors the probe optical signal 235 to determine when the modulation appears on this signal. In one embodiment, the control system 110 adjusts the optical source, thereby changing the wavelength of the modulated pump optical signal 125 using the laser adjustment signal 115 until the modulation appears on the probe optical signal 235, thereby indicating the carrier wavelength of the pump optical signal 125 (as well as the optical signals 120 and 235) corresponds to a peak of the absorption spectrum.

In addition, the control system 110 outputs a modulation control signal 250 that controls the modulation performed by the modulator 215 in order to modulate (i.e., dither) the intermediate optical signal 230B to generate the modulated pump optical signal 125.

Figure 3:
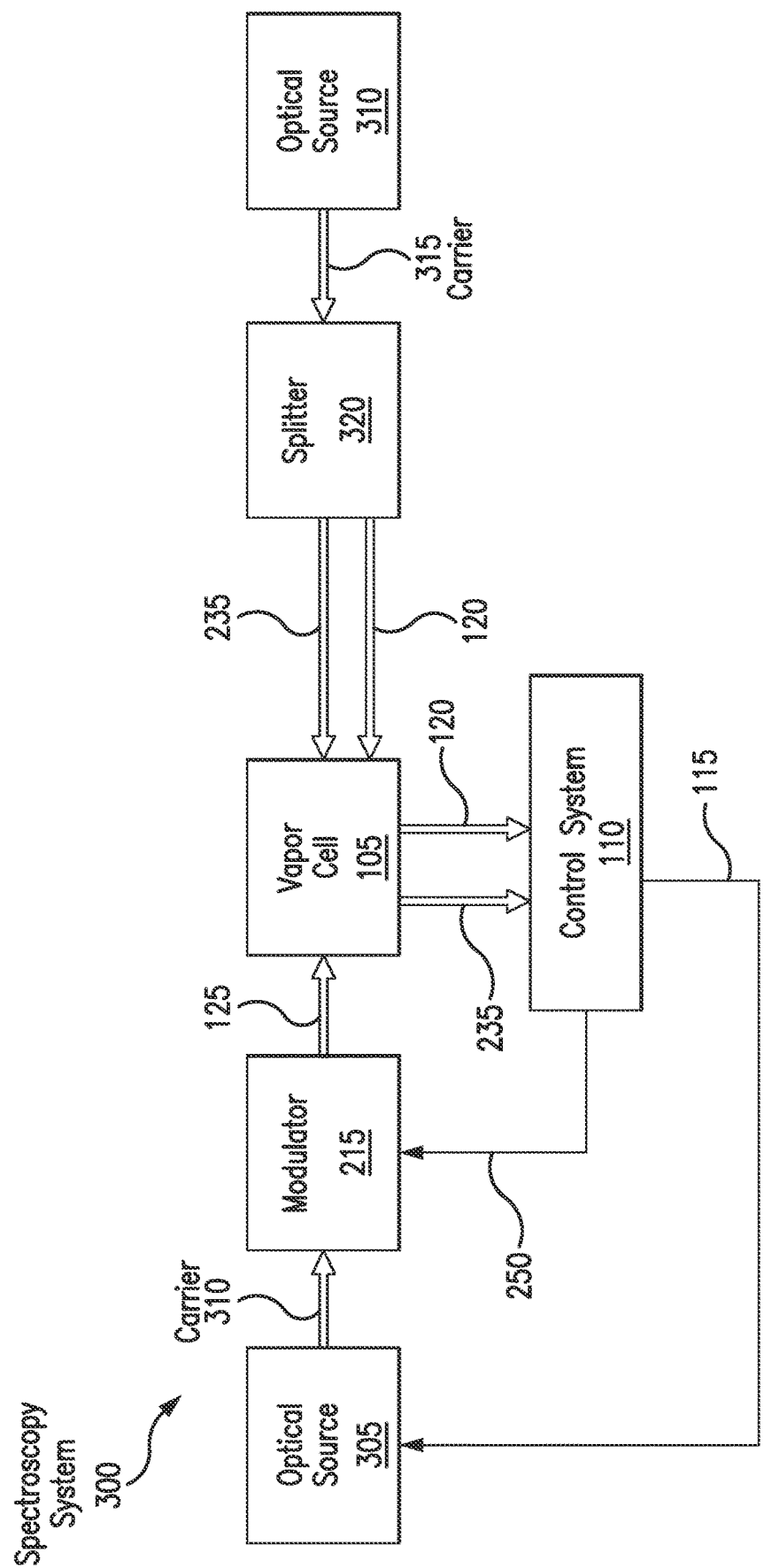
FIG. 3 is a block diagram of a spectroscopy system for performing MTS, according to one embodiment.

FIG. 3 is a block diagram of a spectroscopy system 300 for performing MTS, according to one embodiment. Unlike the system 200, the spectroscopy system 300 includes two optical sources. The optical source 305 outputs a carrier signal (e.g., a CW laser) that is then modulated by the modulator 215 to generate the pump optical signal 125. In contrast, the reference optical signal 120 and the probe optical signal 235 are generated using an optical source 310. In one embodiment, the optical sources 305 and 310 have a fixed frequency relationship between them and move in lock step together.

While the modulator 215 is shown as a separate component from the optical source 305, in one embodiment, the modulator 215 may be omitted and the optical source 305 could be directly modulated to output the modulated pump optical signal 125.

As shown, the optical source 310 generates a carrier optical signal 315 which is then split by a splitter 320 to form the reference optical signal 120 and the probe optical signal 235. Thus, in FIG. 3 the modulated pump optical signal 125 is generated using a different optical source than the reference optical signal 120 and the probe optical signal 235. While doing so means multiple optical sources are used, the spectroscopy system 300 does not have any parasitic modulation where the modulator 215 introduces a modulation on the probe optical signal 235 before reaching the vapor cell 105, which can occur in the spectroscopy system 200.

In an alternative embodiment, instead of splitting the carrier 315 output by the optical source 310, an optical splitter may be disposed after the optical source 305 and before the modulator 215. This optical splitter could split the carrier optical signal 310 so that a first portion could be used as the reference optical signal 120 and the second portion is transmitted to the modulator 215 as shown. In that example, the carrier signal 315 can be used as the probe optical signal 235.

In yet another embodiment, an optical splitter can be disposed after the optical source 305 and before the modulator 215. This optical splitter could split the carrier optical signal 310 so that a first portion could be used as the probe optical signal 235 and the second portion is transmitted to the modulator 215 as shown. In that example, the carrier signal 315 can be used as the reference optical signal 120.

In another embodiment the modulator 215 can provide both the modulation signal and a frequency offset between modulated pump signal 125 and unmodulated optical signals 235 and 120. For example, an AOM can be used for the modulator 215.

Figure 4:
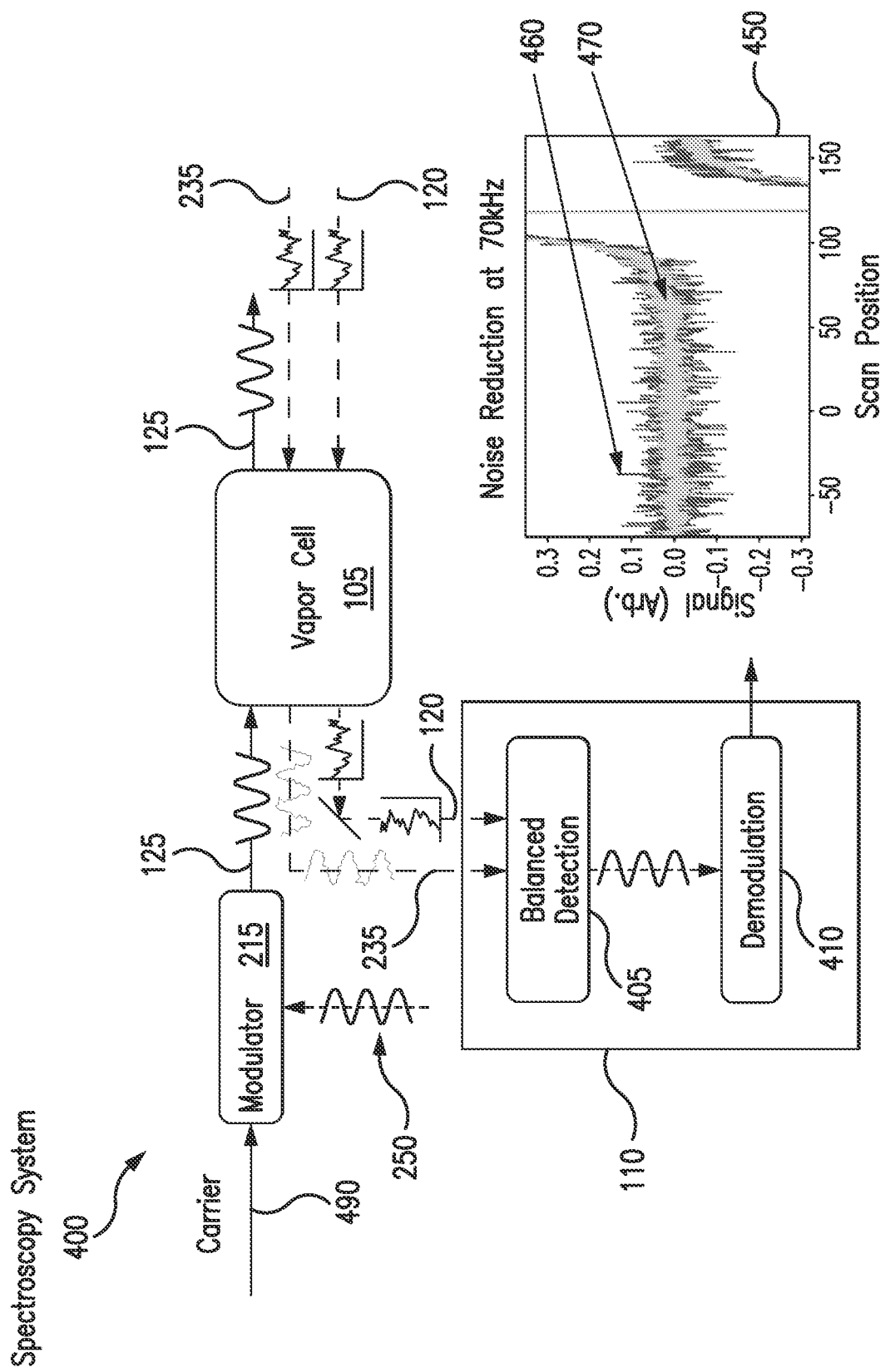
FIG. 4 illustrates a spectroscopy system for mitigating a noise floor using a reference optical signal, according to one embodiment.

FIG. 4 illustrates a spectroscopy system 400 for mitigating a noise floor using the reference optical signal 120, according to one embodiment. The system 400 includes the modulator 215 which modulates a carrier optical signal to generate the pump optical signal 125 which is then input into the vapor cell 105. In parallel, the vapor cell 105 receives the probe optical signal 235 and the reference optical signal 120. These three optical signals can be generated from the same optical source as shown in FIG. 2, or can be generated using different optical sources as shown in FIG. 3.

Although not illustrated in FIG. 4, the modulated pump optical signal 125 is aligned with the probe optical signal 235 such that the modulation in the pump optical signal 125 can be transferred to the probe optical signal within the vapor cell 105. For example, their optical paths may be aligned such that the optical signals 125 and 235 propagate on the same axis within the vapor cell 105 but in opposite directions. In contrast, the optical path of the reference optical signal 120 in the vapor cell 105 may be offset such that the modulation on the pump optical signal 125 does not transfer to it.

FIG. 4 further illustrates that when the probe optical signal 235 is output from the vapor cell 105, this signal 235 now has the modulation that was previously only on the pump optical signal 125. That is, because the wavelength of the optical signal 125 is at a wavelength that corresponds to a peak of the absorption spectrum, the modulation is transferred from the pump optical signal 125 to the probe optical signal 235. However, the modulation is not transferred onto the reference optical signal 120. Thus, the probe optical signal 235 is affected by both the modulation on the pump optical signal 125 as well as the PM to AM noise conversion. The reference optical signal 120, however, is only affected by the PM to AM noise conversion.

The control system 110 includes a balanced detection module 405 which can include photodetectors for converting the signals 120 and 235 received from the vapor cell 105 into electrical signals. By subtracting these electrical signals, the noise from the PM to AM noise conversion can be removed. An alternative implementation is to digitize the two electrical signals and then subtract them digitally. Thus, FIG. 4 illustrates that the balanced detection module 405 outputs to a demodulation module 410 a signal that is synchronized with the modulation signal used by the modulator 215 to generate the pump optical signal 125. The demodulation module 410 (e.g., hardware, software, or combination thereof) then generates a signal indicating whether the modulation is present, thereby indicating whether or not the carrier wavelength of the carrier optical signal 490 is at a wavelength corresponding to a peak of the absorption spectrum of the vapor cell 105. In yet another implementation the electrical signal generated from the unmodulated reference signal 120 can be used to servo the noise on the optical signal in a feedback loop directly.

The graph 450 in FIG. 4 illustrates the improvement in the noise floor achieved when using the reference optical signal 120. Specifically, the plot 460 indicates the noise floor when the reference optical signal 120 is not present (or not being used) in the system 400 while the plot 470 indicates the noise floor when the reference optical signal 120 is used. As shown, when scanning through different wavelengths on the X axis, when not at a resonance feature corresponding to a peak of the absorption spectrum (e.g., around 120 on the X axis), the plot 460 has a larger noise floor than the plot 470. This noise floor makes it more difficult to detect when the wavelength is at or near the resonance feature. Thus, by using the reference optical signal 120, the noise floor at or near the resonance feature can be reduced thereby improving the SNR of the system 400.

Figure 5A:
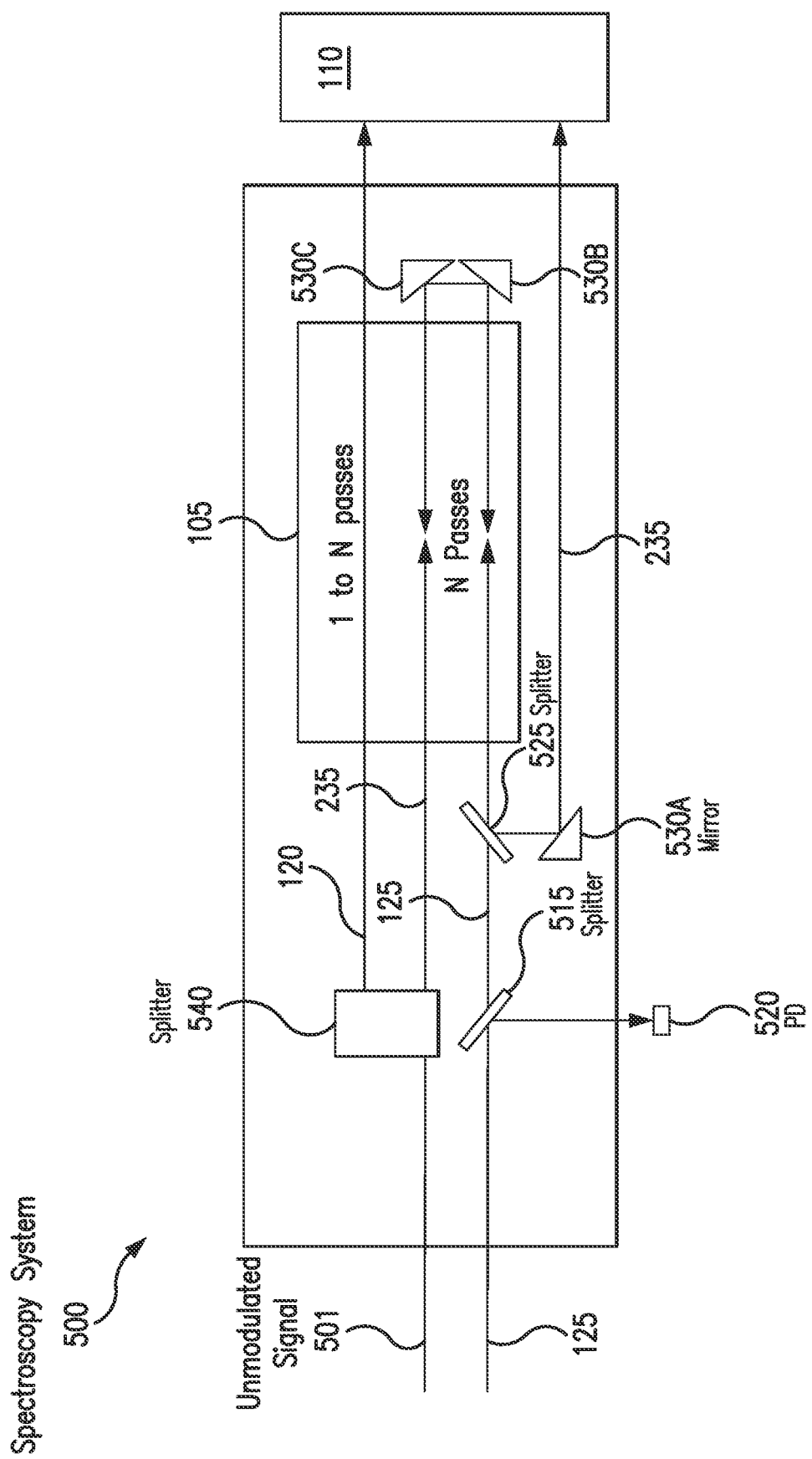
FIGS. 5A and 5B illustrate spectroscopy systems for performing MTS, according to one embodiment.

FIG. 5A illustrates a spectroscopy system 500 for performing MTS, according to one embodiment. Starting at the left, in one embodiment, one optical fiber transmits an unmodulated signal 501 while another optical fiber transmits the modulated pump optical signal 125. These optical signals 501 and 125 can be generated using the same optical source as shown in FIG. 2 or different optical sources as shown in FIG. 3.

In one embodiment, the signals 501 and 125 are converted to free-space optical signals. The unmodulated signal 501 is transmitted to a splitter 540. The splitter 540 splits the unmodulated signal 501 to output the unmodulated reference optical signal 120 and the unmodulated probe optical signal 235. In one embodiment, the splitter 540 is designed such that the intensity of the reference optical signal 120 approximately matches the probe optical signal 235 in the vapor cell 105.

Both the probe optical signal 235 and the reference optical signal 120 are input into the vapor cell 105 through, for example, a transparent side of the vapor cell 105.

In parallel, the modulated pump optical signal 125 is transmitted to a splitter 515 that redirects a portion of the pump optical signal 125 to a photodiode (PD) 520. The splitter 515 and the PD 520 can be used to detect residual amplitude modulation (RAM) on the pump beam and servo it out with the control system.

The remaining portion of the pump optical signal 125 is transmitted to a splitter 525. In this embodiment, the splitter 525 permits substantially all of the pump optical signal 125 to pass therethrough. For example, the pump optical signal 125 may have a polarization that permits it to pass through the splitter so that substantially none of the signal 125 is reflected by the splitter 525. Instead, the pump optical signal 125 enters the vapor cell 105.

The pump optical signal 125 can pass through the vapor cell 105 1, 2, 3, or N number of times. In FIG. 5A, the system 500 includes the mirrors 530B and 530C to pass the optical signal 125 through the vapor cell 105 two times. Further, the optical path of the pump optical signal 125 is aligned with the optical path of the probe optical signal 235 in the vapor cell 105. In this example, the pump optical signal 125 and the probe optical signal 235 have a shared optical path but travel in opposite directions along that path. For example, if the pump optical signal 125 and the probe optical signal 235 only passed through the vapor cell 105 once, then the probe optical signal 235 and the pump optical signal 125 may be input into the vapor cell 105 on opposite sides.

After passing through the vapor cell 105 N number of times, the probe optical signal 235 reaches the beam splitter 525 which redirects this signal onto the mirror 530A. That is, while the beam splitter 525 is transparent to the pump optical signal 125, the splitter 525 reflects the probe optical signal 235 towards the mirror 530A (due to its polarization) which then directs the signal 235 to the control system 110. Thus, the splitter 525 is used to separate the probe optical signal 235 from the pump optical signal 125. As discussed above, the control system 110 can detect whether or not the modulation in the pump optical signal has been transferred onto the probe optical signal 235. This information can then be used to adjust the wavelength of the optical source (not shown) generating the pump optical signal 125.

The reference optical signal 120 can also pass through the vapor cell 105 N number of times before being detected by the control system 110. Further, the reference optical signal 120 can pass through the vapor cell 105 a non-integer number of times.

In one embodiment, the reference optical signal 120 passes through the vapor cell 105 the same number of times as the probe optical signal 235. However, in another embodiment, the reference optical signal 120 passes through the vapor cell 105 fewer, or more, times than the probe optical signal 235. In either case, the splitter 540 can be designed such that the intensity of the reference optical signal 120 in the vapor cell 105 approximately matches the intensity of the probe optical signal 235. Moreover, the length of the optical path of the reference optical signal 120 in the vapor cell 105 does not have to equal the length of the optical path of the probe optical signal 235 to achieve the benefits described herein, so long as the optical powers and electronic gains are optimized. Thus, the reference optical signal 120 can pass through the vapor cell 105 a different number of times than the probe optical signal 235.

The control system 110 can use a balanced detector to measure the probe optical signal 235 and the reference optical signal 120 and subtract the measured PM to AM noise from the desired MTS signal, as previously described.

Figure 5B:
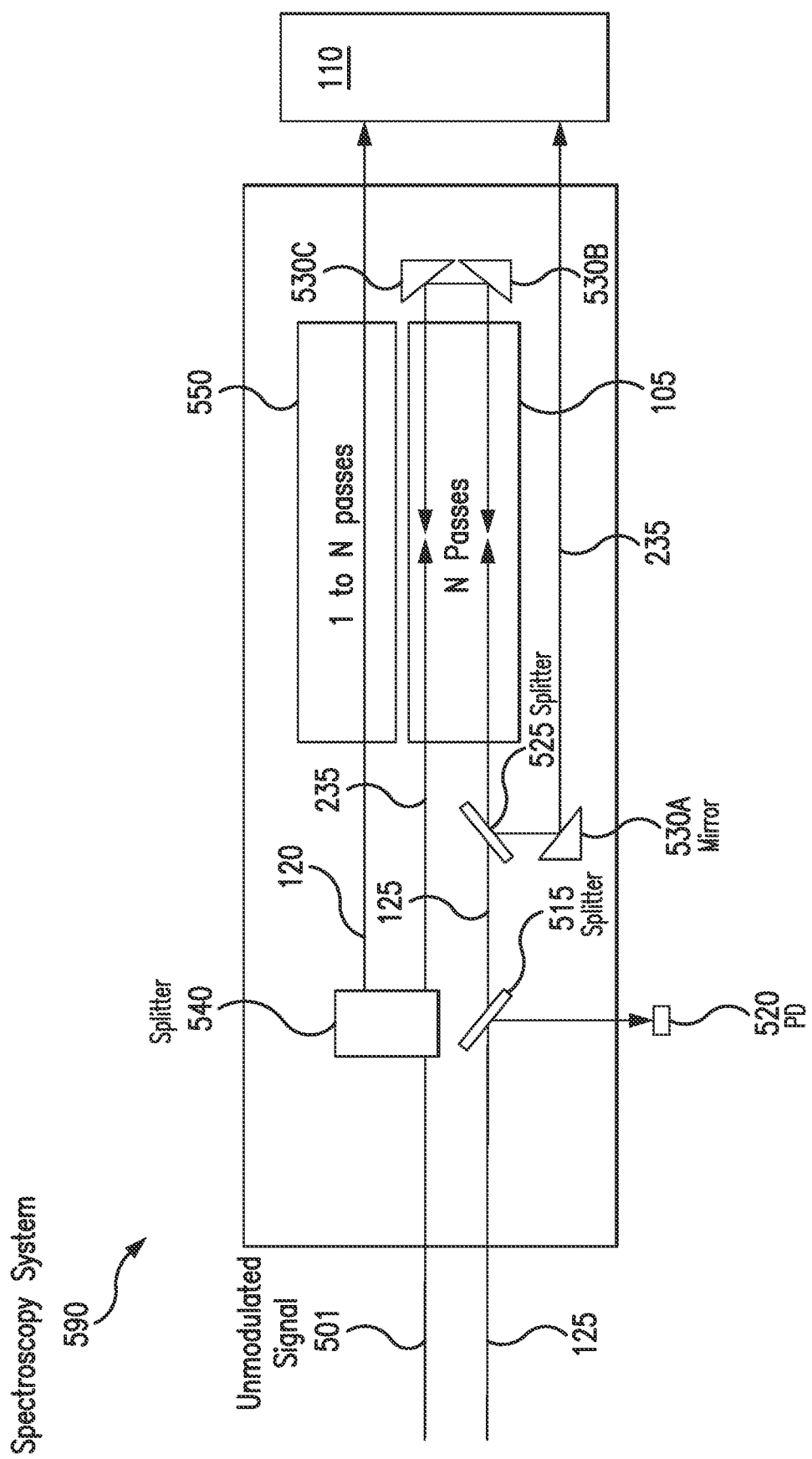

FIG. 5B illustrates a spectroscopy system 590 for performing MTS, according to one embodiment. The spectroscopy system 590 includes many of the same components of FIG. 5A except the system 590 includes a separate secondary vapor cell 550 through which the reference optical signal 120 passes. That is, the reference optical signal 120 passes through a different vapor cell 550 than the optical signals 235 and 125. The reference optical signal 120 experiences absorption by the vapor cell 550, which converts laser phase noise to amplitude noise like the other optical signals passing through the separate vapor cell 105. Thus, FIGS. 5A and 5B illustrate that the same advantages of using the reference optical signal 120 can be obtained whether the reference optical signal 120 passes through the same vapor cell or a different vapor cell (e.g., a secondary vapor cell).

The vapor cells 105 and 550 may be the same type of vapor cells (e.g., include the same vapor or gas).

Figure 6:
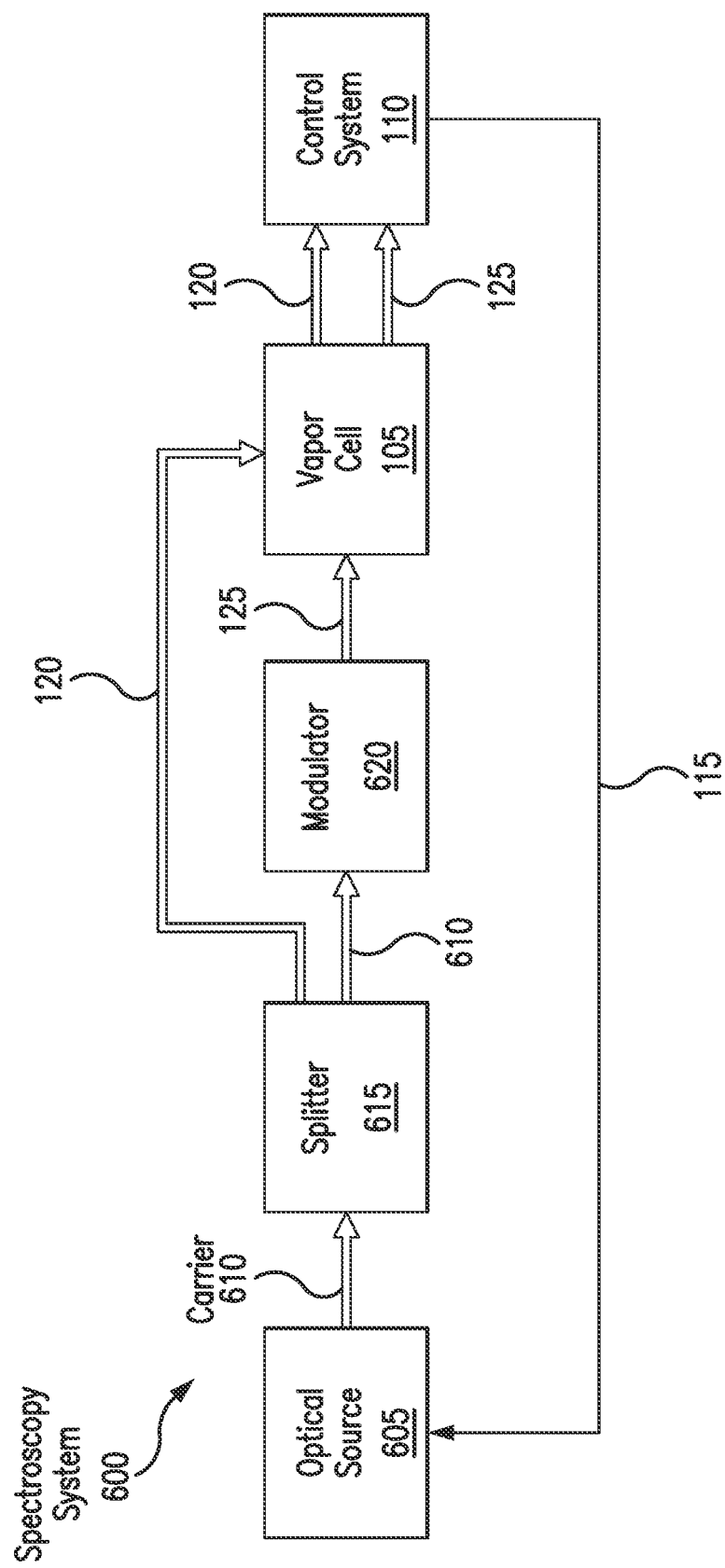
FIG. 6 is a block diagram of a spectroscopy system for performing Frequency Modulation Spectroscopy, according to one embodiment.

FIG. 6 is a block diagram of a spectroscopy system 600 for performing FMS, according to one embodiment. Unlike in MTS, this example of FMS does not use a separate probe optical signal.

The system 600 includes an optical source 605 that outputs a carrier optical signal 610 which is then split by a beam splitter 615 to form the reference optical signal 120. The remaining portion of the carrier optical signal 610 is modulated by the modulator 620 to generate the modulated pump optical signal 125.

Both the reference optical signal 120 and the pump optical signal 125 pass through the vapor cell 105, but use different optical paths. That way, the modulation on the pump optical signal 125 is not transferred onto the reference optical signal 120.

Both the reference optical signal 120 and the pump optical signal 125 are measured by the control system 110 which subtracts the measured PM to AM noise from the desired FMS signal. Moreover, the control system 110 can use the measured pump optical signal 125 to generate the laser adjustment signal 115 to change the wavelength of the carrier signal 610 output by the optical source 605.

Figure 7A:
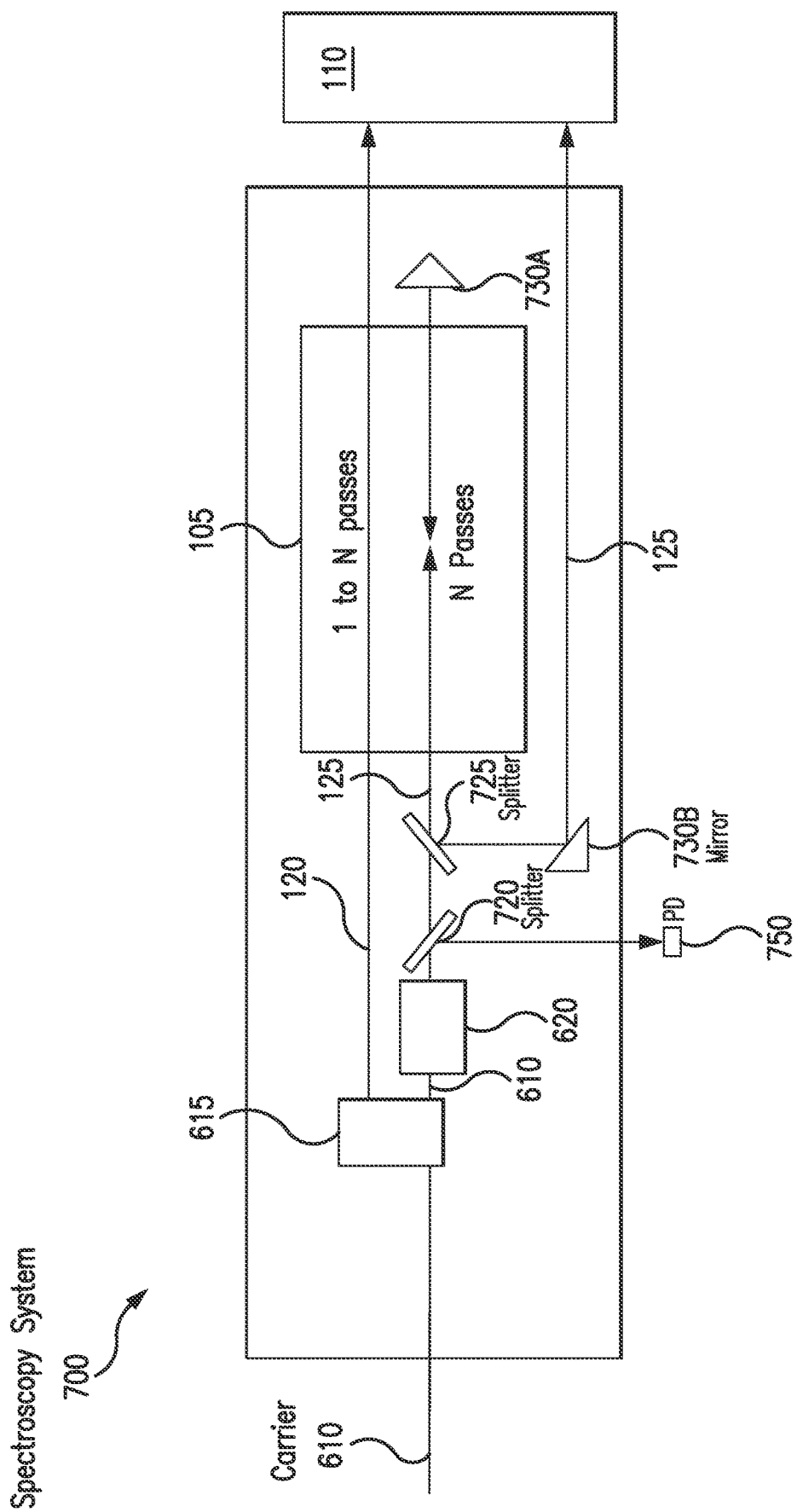
FIGS. 7A and 7B illustrate spectroscopy systems for performing Frequency Modulation Spectroscopy, according to one embodiment.

FIG. 7A illustrates a spectroscopy system 700 for performing FMS, according to one embodiment. Starting at the left, in one embodiment, an optical fiber transmits the carrier optical signal 610 which was generated using an optical source that is not shown in FIG. 7.

The optical signal can be converted into a free-space optical signal that is split by the beam splitter 615. That is, the beam splitter 615 outputs the unmodulated reference optical signal 120 while the remaining portion of the carrier optical signal 610 is transmitted to the modulator 620 which outputs the modulated pump optical signal 125. The modulator 620 and the modulator 215 in FIG. 2 could be an electro-optic modulator (EOM) or an acousto-optic modulator (AOM).

A splitter 720 redirects a portion of the pump optical signal 125 to PD 750. The splitter 720 and the PD 750 can be used to measure and remove RAM from the modulated pump beam 125 as discussed above in FIGS. 5A and 5B.

The remaining portion of the pump optical signal 125 passes through another beam splitter 725 and enters the vapor cell 105. In this example, the pump optical signal 125 passes through the vapor cell 105 twice since the opposite end of the vapor cell 105 includes a mirror 730A which reflects the signal 125 back through the vapor cell 105. However, additional mirrors can be used so that the pump optical signal 125 passes through the vapor cell 105 any number of times (e.g., N number of times).

After again reaching the splitter 725, the pump optical signal 125 is reflected down towards the mirror 730B, which reflects the signal 125 to the control system 110 where it is detected and measured. For example, a quarter waveplate (not shown) can be placed in front of mirror 730A. After going through this waveplate twice, the polarization of the signal 125 is flipped. Alternatively, the quarter waveplate may be disposed after splitter 725 but before the cell 105. In yet another embodiment, the splitter 725 could be a 50/50 beam splitter.

In parallel with the signal 125 passing through the cell 105, the reference optical signal 120 passes through the vapor cell 105 1, 2, 3, or N number of times. In one embodiment, the reference optical signal 120 passes through the vapor cell 105 the same number of times as the pump optical signal 125. However, in another embodiment, the reference optical signal 120 passes through the vapor cell 105 fewer, or more, times than the pump optical signal 125.

The control system 110 can use a balanced detector to measure the pump optical signal 125 and the reference optical signal 120 and subtract the measured PM to AM noise from the desired FMS signal.

While FMS and MTS techniques are described, the embodiments are not limited to any particular type of spectroscopy technique. Further, the vapor cell 105 can have various shapes, sizes, and vapors (e.g., rubidium or iodine).

Figure 7B:
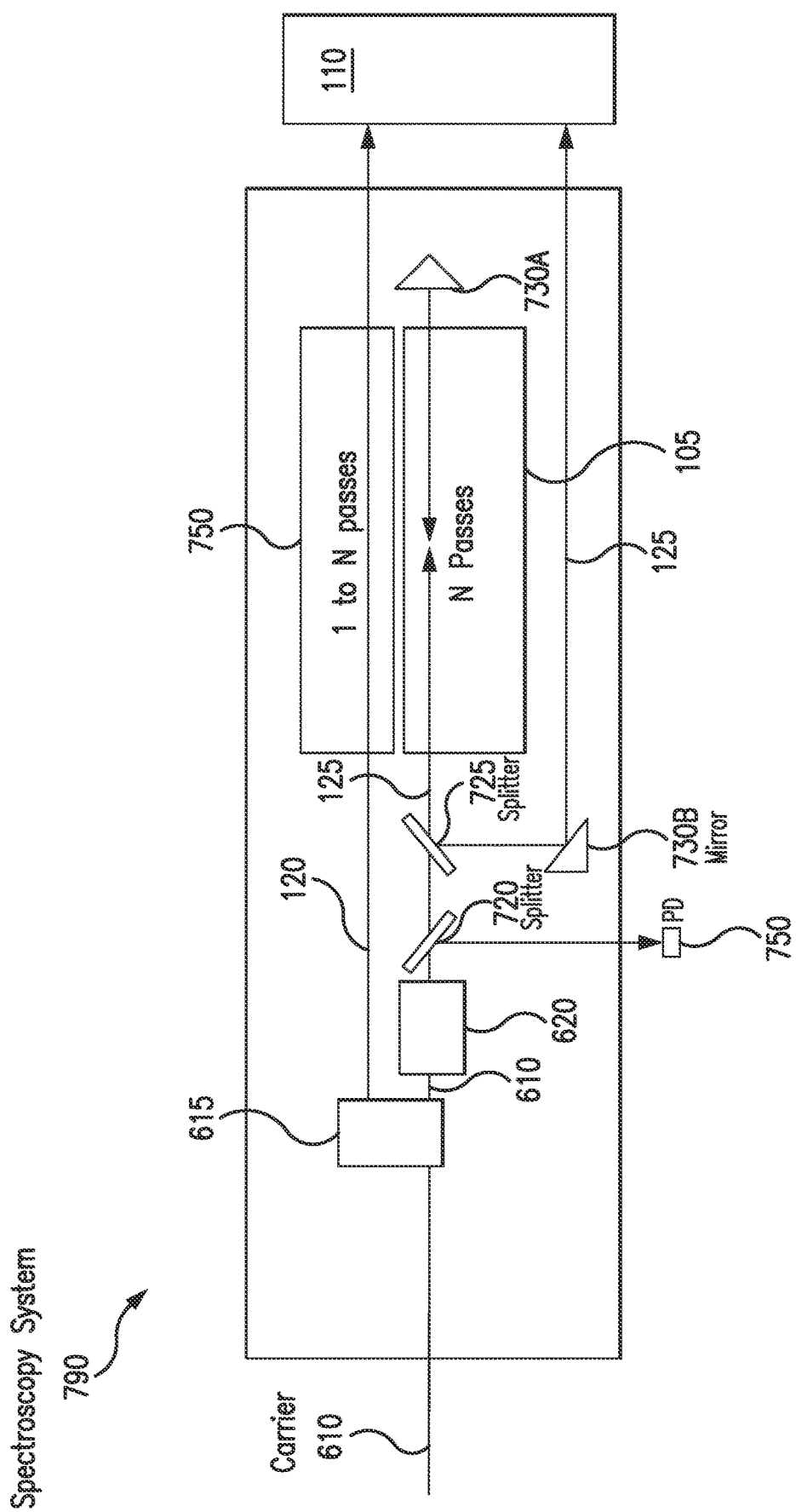

FIG. 7B illustrates a spectroscopy system 790 for performing FMS, according to one embodiment. The spectroscopy system 790 includes many of the same components of FIG. 7A except the system 790 includes a separate secondary vapor cell 750 through which the reference optical signal 120 passes. That is, the reference optical signal 120 passes through a different vapor cell 750 than the optical signal 125. The reference optical signal 120 experiences absorption by the vapor cell 750, which converts laser phase noise to amplitude noise like the other optical signals passing through the separate vapor cell 105. Thus, FIGS. 7A and 7B illustrate that the same advantages of using the reference optical signal 120 can be obtained whether the reference optical signal 120 passes through the same vapor cell or a different vapor cell (e.g., a secondary vapor cell).

The vapor cells 105 and 750 may be the same type of vapor cells (e.g., include the same vapor or gas). Further, the dimensions of the vapor cells 105 and 750 may the same or similar.

Figure 8:
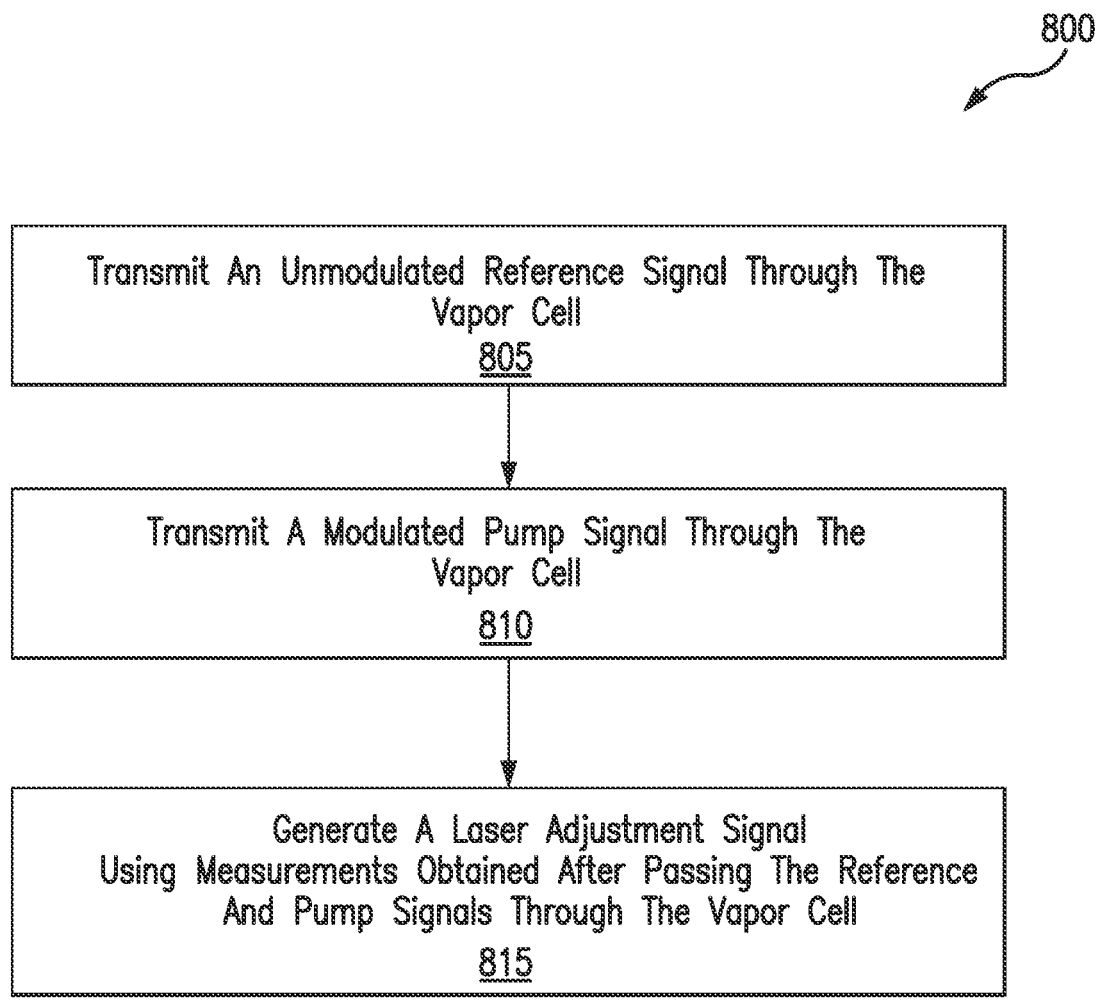
FIG. 8 is a flowchart for performing spectroscopy using a reference optical signal, according to one embodiment.

FIG. 8 is a flowchart of a method 800 for performing spectroscopy using a reference optical signal, according to one embodiment. The method 800 can be used to perform any spectroscopy technique (e.g., FMS, MTS, etc.) that can benefit from using an unmodulated reference optical source to reduce various types of noise and interference in the system.

At block 805, the unmodulated reference optical signal is transmitted through the vapor cell. The reference optical signal can pass through the vapor cell any number of times.

In parallel with transmitting the reference optical signal through the vapor cell, at block 810 the modulated pump optical signal is transmitted through the same vapor cell any number of times. In one embodiment, the optical paths of the reference optical signal and the pump optical signal through the vapor cell are offset. That way, the modulation on the pump optical signal is not transferred to the reference optical signal. In one embodiment, the optical paths of these signals are non-crossing. In one embodiment, the optical paths of the reference optical signal and the pump optical signal through the vapor cell are arranged so that these signals do not interact in the vapor cell.

At block 815, the control system generates a laser adjustment signal for adjusting a wavelength of an optical source using measurements obtained after passing the reference and pump optical signals through the vapor cell. In one embodiment, the optical source that is adjusted is the optical source that generates the modulated pump optical signal. In one embodiment, the reference optical signal is also generated by the optical source that generates the pump optical signal. However, in another embodiment, the reference optical signal is generated by a different optical source, which can have a fixed frequency relationship between them and move in lock step together.

When performing FMS, the laser adjustment signal can be derived by measuring the reference and pump optical signals at a control system as illustrated in FIGS. 6-7.

When performing MTS, the method 800 can include transmitting a probe optical signal through the vapor cell. In that case, the laser adjustment signal generated at block 815 is derived by measuring the reference and probe optical signals at a control system as illustrated in FIGS. 2-5.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

As will be appreciated by one skilled in the art, the embodiments disclosed herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A spectroscopy system, comprising:
   a first vapor cell configured to receive as an input an unmodulated reference optical signal; and
   a second vapor cell configured to receive as an input a modulated pump optical signal; and
   a control system configured to:
      detect optical signals resulting from the unmodulated reference optical signal and the modulated pump optical signal passing through the first and second vapor cells,
      generate a laser adjustment signal for adjusting a wavelength or frequency of a first optical source, wherein an output of the first optical source is used to generate the modulated pump optical signal, and
      reduce, using the unmodulated reference optical signal output from the first vapor cell, a noise floor associated with a spectroscopy signal.

2. The spectroscopy system of claim 1, wherein the spectroscopy system is arranged such that the unmodulated reference optical signal passes through the first vapor cell with a different path length than the modulated pump optical signal passes through the second vapor cell.

3. The spectroscopy system of claim 1, wherein the second vapor cell is configured to receive a probe optical signal into the second vapor cell, wherein an optical path of the probe optical signal is aligned with the optical path of the modulated pump optical signal in the second vapor cell.

4. The spectroscopy system of claim 3, further comprising:
a first beam splitter configured to receive a first optical signal and output the unmodulated reference optical signal and the probe optical signal, wherein one output of the first beam splitter is coupled to the first vapor cell and a second output of the first beam splitter is coupled to the second vapor cell.

5. The spectroscopy system of claim 4, further comprising:
a modulator configured to output the modulated pump optical signal to the second vapor cell; and
a second beam splitter configured to receive a second optical signal from the first optical source and output the first optical signal and a third signal, wherein a first output of the second beam splitter is coupled to the first beam splitter and a second output of the second beam splitter is coupled to an input of the modulator.

6. The spectroscopy system of claim 5, further comprising:
a second optical source configured to generate and transmit the first optical signal to the first beam splitter.

7. The spectroscopy system of claim 3, wherein the spectroscopy signal is derived from the modulated pump optical signal and the probe optical signal.

8. The spectroscopy system of claim 3, wherein the control system is configured to perform Modulation Transfer Spectroscopy (MTS) using the modulated pump optical signal, the unmodulated reference optical signal, and the probe optical signal.

9. The spectroscopy system of claim 1, further comprising:
a beam splitter configured to receive an output of the first optical source, wherein a first output of the beam splitter is coupled to the first vapor cell and outputs the unmodulated reference optical signal and a second output of the beam splitter outputs an intermediate optical signal; and
a modulator comprising an input coupled to the second output of the beam splitter, wherein the modulator is configured to generate and transmit the modulated pump optical signal to the second vapor cell.

10. The spectroscopy system of claim 9, further comprising:
a reflector configured to reflect the modulated pump optical signal back on itself after the modulated pump optical signal has passed through the second vapor cell at least one time.

11. The spectroscopy system of claim 1, wherein the control system is configured to perform Frequency Modulation Spectroscopy (FMS) using the modulated pump optical signal and the unmodulated reference optical signal.

12. A method, comprising:
transmitting an unmodulated reference optical signal through a first vapor cell and a modulated pump optical signal through a second vapor cell in parallel;
generating a laser adjustment signal for adjusting a wavelength of a first optical source based on the unmodulated reference optical signal passing through the first vapor cell and the modulated pump optical signal passing through the second vapor cell, wherein the first optical source generates the modulated pump optical signal; and
reducing, using the unmodulated reference optical signal output from the first vapor cell, a noise floor associated with a spectroscopy signal.

13. The method of claim 12, further comprising:
transmitting a probe optical signal through the second vapor cell, wherein an optical path of the probe optical signal is aligned with the optical path of the modulated pump optical signal in the second vapor cell.

14. The method of claim 13, further comprising:
splitting, using a first beam splitter, a first optical signal to output the unmodulated reference optical signal and the probe optical signal before passing the unmodulated reference optical signal and the probe optical signal through the first and second vapor cells.

15. The method of claim 14, further comprising:
splitting, using a second beam splitter, a second optical signal received from the first optical source to generate the first optical signal and a third optical signal; and
modulating the third optical signal to generate the modulated pump optical signal before transmitting the modulated pump optical signal to the second vapor cell.

16. The method of claim 14, further comprising:
generating the first optical signal using a second optical source different from the first optical source, wherein an output of the second optical source is coupled to an input of the first beam splitter.

17. The method of claim 13, wherein the spectroscopy signal is derived from the modulated pump optical signal and the probe optical signal.

18. The method of claim 12, further comprising:
splitting an output of the first optical source to output the unmodulated reference optical signal and an intermediate optical signal; and
modulating the intermediate optical signal to generate the modulated pump optical signal.

19. The method of claim 18, further comprising:
reflecting the modulated pump optical signal back on itself after the modulated pump optical signal has passed through the second vapor cell at least one time.

20. A spectroscopy system, comprising:
a first vapor cell configured to receive as an input an unmodulated reference optical signal;
a second vapor cell configured to receive as inputs a modulated pump optical signal and a probe optical signal, wherein optical paths of the probe optical signal and the modulated pump optical signal are controlled in the second vapor cell such that modulation in the modulated pump optical signal is transferred to the probe optical signal; and
a control system configured to:
generate a laser adjustment signal for adjusting a wavelength or frequency of a first optical source, wherein an output of the first optical source is used to generate the modulated pump optical signal, and
reduce, using the unmodulated reference optical signal output from the first vapor cell, a noise floor associated with the probe optical signal.

* * * * *